May 29, 1934.  C. B. THOMPSON ET AL  1,960,518

LUBRICATION DEVICE

Filed June 27, 1932

INVENTORS.
CARL B. THOMPSON AND OTTO B. CLARK
BY John A. Watson
ATTORNEY.

Patented May 29, 1934

1,960,518

UNITED STATES PATENT OFFICE 1,960,518

LUBRICATION DEVICE

Carl B. Thompson and Otto B. Clark, South Bend, Ind., assignors to The Lubrication Corporation, South Bend, Ind., a corporation of Delaware Application June 27, 1932, Serial No. 619,436

3 Claims. (Cl. 285—144)

This invention relates to improvements in lubrication devices and more particularly to lubricant discharge nozzles of the lubricant pressure operated clamp type.

An object of the invention is to provide an improved lubricant pressure operated clamp type nozzle for delivering lubricant under pressure to a lubricant receiving fitting upon which the nozzle is clamped wherein the lubricant pressure operated clamping means must first function to clamp the nozzle upon the fitting before lubricant under operating pressure may be present at the discharge orifice of the nozzle.

Another object is to provide a lubricant discharge nozzle of the character described wherein manual thrust applied to the external and rearward end of the conduit may be directly imparted to the fitting engaging portion thereof to facilitate initial engagement and low pressure lubricant seal between the nozzle and the fitting.

Other objects, the advantages and uses of the invention, will be, or should become apparent after reading the following description and claims and after consideration of the accompanying drawing forming a part of this specification, in which:

In general, the pressure operated clamp type nozzle selected for illustration herein comprises, a conduit A having a discharge orifice B at one end the walls of which are adapted for engagement with the head of a lubricant receiving nipple or fitting N to establish a seal therebetween and having its other end adapted for connection to a pressure feed source of lubricant supply, a clamping member C slidably mounted upon the conduit A provided with a nipple or fitting engaging jaw D and lubricant pressure operated mechanism including means afforded by forming the conduit A with a tortuous passage E for moving the clamping member relative to the conduit to clamp the nozzle upon the head of the fitting N prior to building up a substantial operating pressure at the discharge orifice B.

Figure 1:
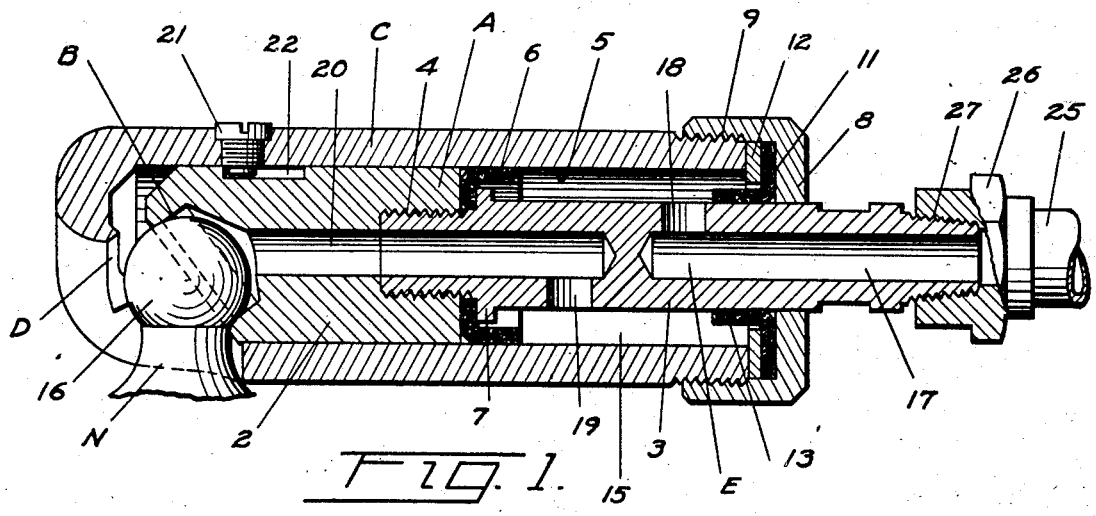
Fig. 1 is a sectional view of a lubricant discharge nozzle constructed in accordance with our invention shown as initially engaged with a lubricant receiving fitting.
Figure 2:
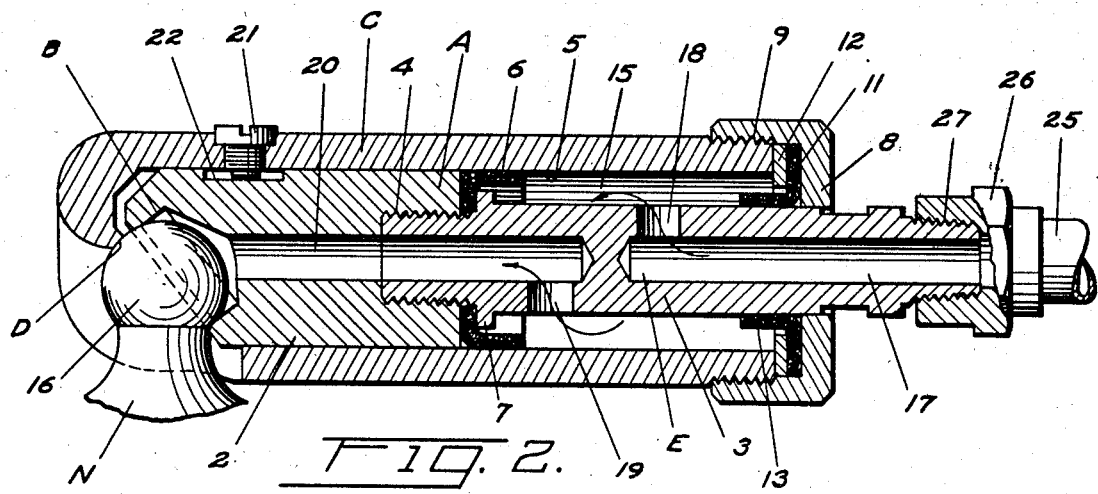
Fig. 2 is a view similar to Fig. 1 illustrating the nozzle clamped upon the fitting.
Figure 3:
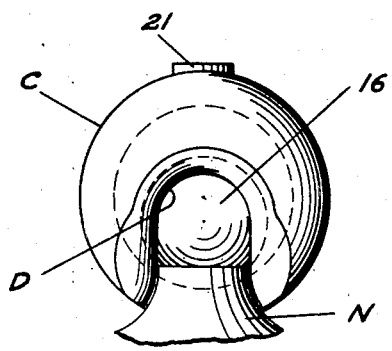
Fig. 3 is an end elevation of the discharge nozzle.

Referring particularly to Figs. 1 and 2, the conduit A comprises a pair of aligned members 2 and 3 secured to one another by threaded engagement as shown at 4. The member 2 or discharge end of the conduit is of greater external diameter than the member 3 and each is formed with cylindrical side walls. The clamping member C is tubular in major cross section and the inner cylindrical wall 5 thereof is arranged to slidably engage with the external wall of the conduit member 2 thereby providing an annular space between the wall 5 of the clamping member and the conduit member 3.

A cup shaped sealing washer 6, preferably constructed of rawhide, is secured between the rearward end wall of the conduit member 2 and a flange 7 formed integral with the conduit member 3 with its skirt extending rearwardly and engaged with the inner wall 5 of the clamping member C to form a lubricant tight seal between the member 2 and the clamping member C. The rearward end of the clamping member is provided with an annular closure cap 8 encompassing the conduit member 3 and secured to the clamping member by threaded engagement as shown at 9. An annular sealing member 11, which may also be of rawhide, is secured between the cap 8 and a washer 12 bearing upon the end wall of the clamping member and is formed with a forwardly extending tubular portion 13 engaged with the outer wall of the conduit member 3 to form a seal between the conduit and the rearward end of the clamping member.

There is thus formed of the annular space between the conduit and the inner wall of the clamping member C a fluid tight chamber 15 which when lubricant under pressure is admitted thereto may expand by relative movement between the clamping member C and the conduit A in that direction to cause the clamping jaw D to approach and engage with the head 16 of the lubricant receiving fitting N when in registration with the discharge orifice B.

To assure operation of the clamping member C with its jaw D to clamp the nozzle upon the head of the fitting prior to subjecting the discharge orifice of the nozzle to operating pressure, lubricant is first admitted to the chamber 15 through the rearward portion 17 of the tortuous passage E of the conduit which communicates with the chamber through the medium of a right angle turn 18 in the passage portion 17, the mouth of which is disposed on one side wall of the conduit member 3. A similar right hand turn 19 is formed in the forward portion 20 of the passage E having its mouth located on the opposite side wall of the conduit member 3. Lubricant must therefore enter the chamber 15 to fill the chamber before it may be urged into the forward portion of the passage E, the mouth of which is located on the opposite side of the chamber. The portion 20 of the passage E communicates directly with the discharge orifice B.

A stud screw 21 extends through the wall of the clamping member C and into a longitudinally disposed slot 22 formed in the outer wall of the conduit member 2 to prevent relative rotary movement between the conduit and clamping member, thus properly aligning the clamping jaw D and the discharge orifice B. The slot 22 is sufficiently long to permit the necessary relative longitudinal or axial movement of the members as in clamping and unclamping the nozzle to and from the head of the lubricant receiving fitting. The clamping jaw D is of the general type illustrated and described in the United States patent to Herlihy, Reissue No. 18,288.

In operation the lubricant discharge nozzle may be connected to the discharge port of any suitable type of pressure feed lubricant pump or dispenser as by means of a flexible lubricant conducting hose 25 having an end fitting 26 engageable with the externally threaded end 27 of the conduit A. It is desirable that some form of control valve be included in the discharge line of the pump or dispenser to shut off lubricant flow as between servicing operations. In applying the nozzle to the head 16 of the fitting N, the operator may move the nozzle to bring the discharge orifice B into registration with the head of the fitting with the adjacent walls of the orifice in contact with the surface of the head to form a contact seal therebetween. He may next admit lubricant to the nozzle by opening the shut off or control valve of the pump or dispenser whereupon lubricant under pressure may flow through the portion 17 of the conduit passage E into the chamber 15 to expand the chamber by forcing the clamping member C and conduit A to move relative to one another to the position shown in Fig. 2, thus causing the clamping jaw D to engage with and clamp the conduit securely upon the head 16 of the fitting N. As the lubricant pressure acts to expand the chamber 15, lubricant under pressure will be urged from the chamber 15 into the forward portion 20 of the passage E where it may pass through the discharge orifice B into the fitting N.

The nozzle will remain clamped upon the fitting head as long as lubricant under pressure is present in the chamber 15 and the clamping force applied will bear a direct proportion to the lubricant pressure. It, therefore, becomes necessary to shut off the flow of lubricant to the nozzle prior to unclamping the nozzle, which function may be carried out by drawing rearwardly upon the conduit A or hose 25 to cause relative movement between the clamping member and the conduit pursuant to the position shown in Fig. 1.

It is to be understood that the embodiments of the invention herein set forth are presented for the purpose of illustration only, and various changes may be made without departing from the spirit of the invention and the scope of the appended claims.

We claim:

1. A clamp type lubricant discharge nozzle comprising, a conduit having a discharge orifice at one end, a tubular member slidably mounted upon said conduit, the outer and inner walls of said conduit and said tubular member being so formed as to provide an annular chamber therebetween of varying capacity upon relative longitudinal movement of said tubular member and said conduit, means for rendering said chamber fluid tight, a clamping jaw arranged to clamp the discharge end of said conduit upon a lubricant receiving fitting upon relative movement of said tubular member and said conduit to expand said chamber, and means for connecting the inlet end of said conduit to a source of lubricant supply, the lubricant conducting passageway of said conduit being formed in two parts the adjacent ends of which communicate with said annular chamber.

2. A clamp type lubricant discharge nozzle comprising, a conduit having a discharge orifice at one end, a tubular member slidably mounted upon said conduit, the outer and inner walls of said conduit and said tubular member being so formed as to provide an annular chamber therebetween of varying capacity upon relative longitudinal movement of said tubular member and said conduit, means for rendering said chamber fluid tight, a clamping jaw arranged to clamp the discharge end of said conduit upon a lubricant receiving fitting upon relative movement of said tubular member and said conduit to expand said chamber, and means for connecting the inlet end of said conduit to a source of lubricant supply, the lubricant conducting passageway of said conduit being formed in two parts the adjacent ends of which communicate with said annular chamber upon opposite side walls of the conduit.

3. In a clamp type lubricant discharge nozzle, means providing a discharge orifice, a clamping jaw in operative registration with said orifice, means providing a chamber expandable under the influence of lubricant pressure for causing relative clamping movement between said jaw and the walls of said discharge orifice to clamp a fitting therebetween, means providing a lubricant induction passageway terminating within said chamber, and means providing a lubricant passageway between said chamber and said discharge orifice, the mouths of said passageways communicating with said chamber facing in opposite directions away from one another to cause a circulation of lubricant admitted through the first named passageway through said chamber prior to admission to the second passageway.

CARL B. THOMPSON.
OTTO B. CLARK.